June 8, 1943.   O. J. POUPITCH   2,321,155
LOCK WASHER AND METHOD OF MAKING SAME
Filed Jan. 8, 1941
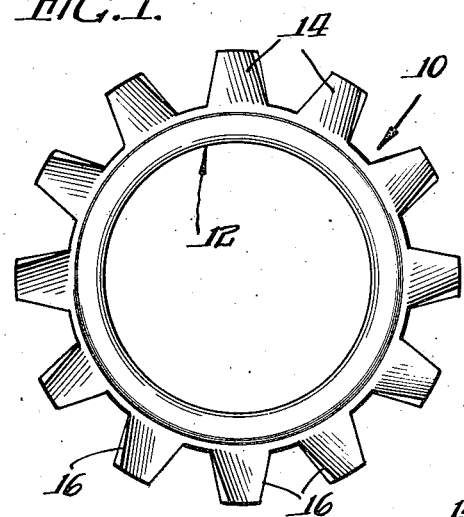
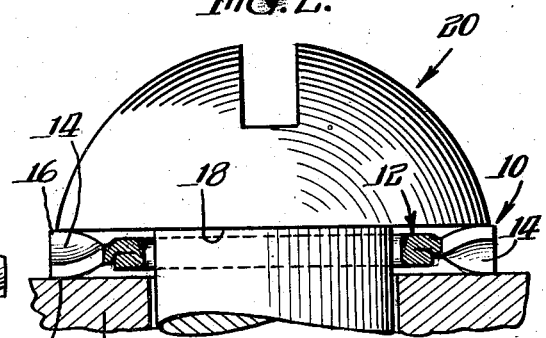
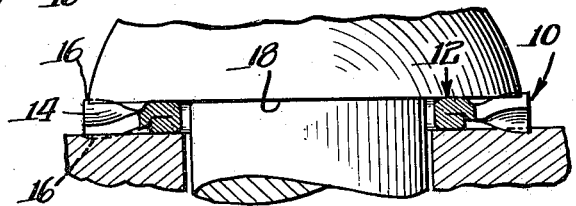
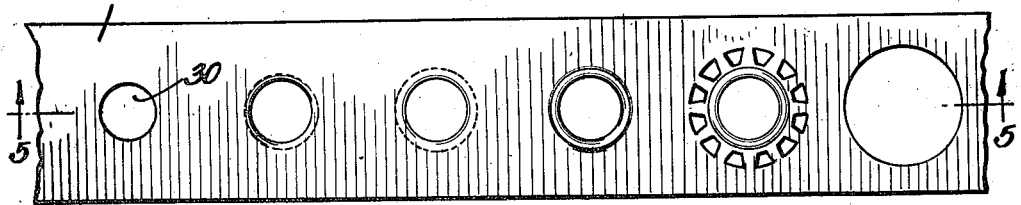
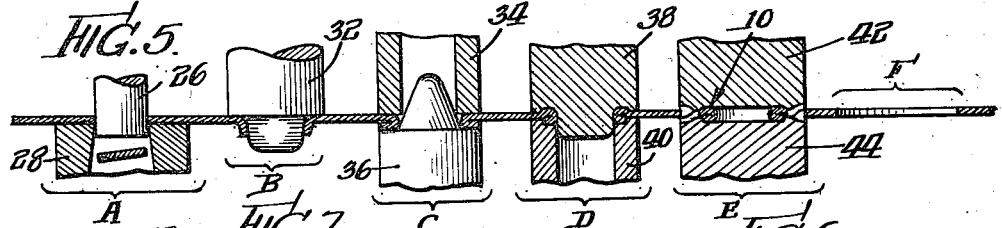
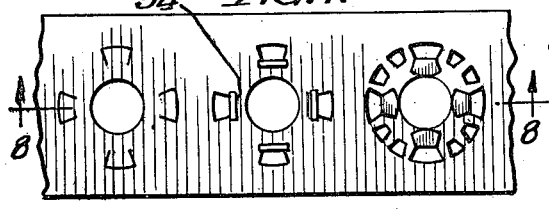
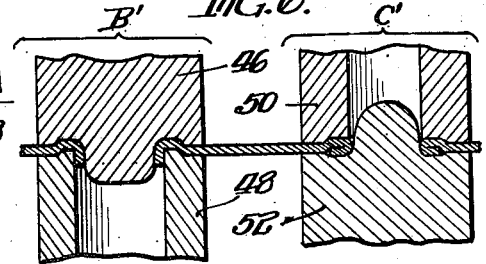
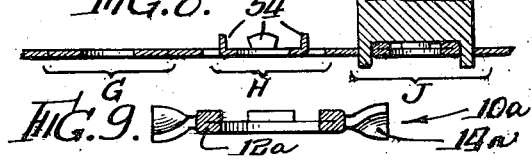
INVENTOR.
Ougljesa Jules Poupitch
BY: Cox Moore & Olson
attys.

Patented June 8, 1943

2,321,155

UNITED STATES PATENT OFFICE 2,321,155

LOCK WASHER AND METHOD OF MAKING SAME

Ougljesa Jules Poupitch, Chicago, Ill., assignor to Illinois Tool Works, Chicago, Ill., a corporation of Illinois Application January 8, 1941, Serial No. 373,530

10 Claims. (Cl. 151—35)

This invention relates generally to lock washers and methods of producing lock washers, the invention being more particularly directed to lock washers of the type wherein means is provided to prevent resilient locking teeth from being completely flattened when the lock washer is clamped against a work surface.

The present invention contemplates a lock washer of the type wherein a plurality of locking elements or teeth extend from an annular body portion of spring stock, said annular body portion presenting a thickness which is greater than the normal thickness of the sheet stock from which the washer is formed whereby to provide oppositely disposed abutment surfaces which will prevent complete flattening of said locking elements or teeth.

More specifically, the present invention proposes a lock washer of the type set forth above wherein the annular body portion is folded upon itself to provide a double thickness of stock and thereby prevent the washer teeth from completely untwisting and flattening.

It is also an object of the present invention to provide the folded washer body arrangement set forth above which may present either a continuous annular fold or a series of folds comprised of sections of the washer stock.

It is also an object of the present invention to provide novel and efficient methods for producing lock washers of the type referred to above and to this end the invention contemplates the use of a progressive punch and die arrangement whereby lock washers may be successively formed from an intermittently shiftable strip of flat stock.

The present invention contemplates methods of lock washer manufacture whereby strip stock material surrounding an aperture therein may be folded or doubled back upon itself either in the form of an annular section or a plurality of circumferentially spaced sections.

The foregoing and other objects and advantages will be more apparent from the following detailed description when considered in connection with the accompanying drawing, wherein:

Fig. 1 is a plan elevational view of a lock washer embodying features contemplated by the present invention;

Fig. 2 is a vertical sectional view of the lock washer of Fig. 1 shown in association with the clamping surface of a screw on one side and a work piece on the opposite side, said clamping surface having been moved into initial contact with the locking elements or teeth of the washer;

Fig. 3 is a view similar to Fig. 2 disclosing the clamping surface of the screw head finally tightened against the lock washer to more clearly illustrate the manner in which the double thickness of washer stock in the vicinity of the body portion thereof provides oppositely disposed abutment surfaces to prevent complete untwisting of the locking elements or prongs;

Fig. 4 discloses a strip of washer stock showing the progressive punching and forming steps which are followed in the practice of the novel methods contemplated by the present invention;

Fig. 5 is a vertical sectional view taken along the line 5—5 of Fig. 4 disclosing in operative association with the stock the tools employed to perform the punching and forming steps illustrated in Fig. 4;

Fig. 6 discloses two modified steps which may be followed in producing the annular fold in place of the three operations disclosed in Fig. 5 for producing the same fold.

Fig. 7 is a view similar to Fig. 4 disclosing a series of modified steps wherein only a limited section of the washer stock is folded over to produce oppositely disposed abutment surfaces as distinguished from the complete annular fold illustrated in Figs. 1 to 6, inclusive;

Fig. 8 is a vertical sectional view taken substantially along the line 8—8 of Fig. 7 to more clearly illustrate the forming operations; and Fig. 9 is a central sectional view of a lock washer provided with annularly arranged abutment surfaces produced by the practice of the method illustrated in Figs. 7 and 8.

Referring now to the drawing more in detail wherein like numerals have been employed to designate similar parts throughout the various figures, it will be seen that one embodiment of the invention comprises a lock washer designated generally by the numeral 10 in Figs. 1 to 3, inclusive. This lock washer includes an annular internal body portion 12 and a plurality of external locking elements or prongs 14 extending from and formed integral with the outer margin of the body portion 12. In the disclosed embodiment the locking elements or prongs 14 are spaced circumferentially along the outer margin of the body portion and each prong presents oppositely disposed locking edges or teeth 16. These locking edges or teeth 16 normally project in opposite directions beyond the bounding planes of the body portion 12 so as to enable operative association therewith on one side by the clamping surface 18 of a screw member 20 and on the other side with the complementary surface of a work piece 22. In the disclosed embodiment locking elements 14 are slightly tapered as viewed in plan and are twisted or warped so as to locate the locking edges 16 in the positions just referred to.

The body portion 12 has a thickness which is substantially twice the thickness of the stock or strip 24, Figs. 4 and 5, from which the washer is formed. This double thickness is provided by folding the inner margin of the washer stock upon itself as clearly illustrated in Figs. 2 and 3. The purpose of this folded arrangement or double thickness of stock will be apparent from the disclosures in Figs. 2 and 3. In Fig. 2 the clamping surface 18 of the screw 20 has been brought into initial contact with the locking edges or teeth 16 projecting upwardly beyond the upper bounding plane of the body portion 12. The lower locking teeth 16 rest upon the surface of the work piece 22. In this position the clamping surface of the screw and the complementary surface of the work are free to engage the locking teeth, the over-all thickness of the body portion 12 being less than the axial distance between the oppositely disposed locking teeth as clearly illustrated in Fig. 2. Continued rotation of the screw 20 in a tightening direction causes the locking teeth 16 to embed themselves within the clamping surface 18 and the oppositely disposed work surface, and ultimately the body portion 12 becomes firmly clamped between the screw and work surface as clearly illustrated in Fig. 3. Thus, the body portion 12 provides abutment surfaces which prevent continued axial movement of the screw and complete untwisting or flattening of the washer elements 14. The folded inner margin of the washer stock provides a thickness which is sufficiently less than the distance between the planes which include the oppositely disposed locking teeth or edges 16 so as to insure operative engagement of said teeth with the screw and work. Likewise, said body portion is sufficiently greater in thickness than the normal thickness of the stock from which the washer is produced so as to provide abutment surfaces axially spaced a distance which will prevent complete flattening of the washer teeth and thereby insure the desired locking efficiency of the washer teeth under all conditions of use.

In Figs. 4 and 5 I have disclosed a method which may be employed in the manufacture of the lock washer 10. The washer stock is fed from left to right as viewed in Figs. 4 and 5. At the first station, which I have designated by the bracket A, a punch 26 cooperates with a die member 28 to produce an aperture 30. At the next station B, a forming member 32 is urged downwardly so as to initially bend downwardly the section of the stock which defines the aperture 30. At the next station C, die members 34 and 36 cooperate to complete the folding over process which was started at station B. At station D die members 38 and 40 cooperate to axially shift the previously folded washer margin so as to centralize the thicker or folded inner margin with the remainder of the stock. At station E the die members 42 and 44 function to form the locking elements along the outer margin of the folded stock, and at station F the previously formed washer is completely severed from the strip stock.

In Fig. 6 I have disclosed die members which reduce the three steps B, C and D to two steps. Thus, station B' of Fig. 6 includes a pair of die members 46 and 48 which function to not only preliminarily bend the stock downwardly as in station B of Fig. 5 but simultaneously urge an annular section of the stock upwardly with respect to the main body of the washer stock. At station C' the portion which is bent downwardly at station B' is folded over against the upper portion and by these two steps the folded annular body portion is centralized with respect to the strip stock. The die members at station C' are designated by the numerals 50 and 52.

In Figs. 7 and 8, a slightly modified method is disclosed. I have found that in certain instances it may be desirable to avoid the necessity of folding over a continuous annular section of stock. Thus, in Fig. 7 tabs 54 as distinguished from the continuous annular folded over portion previously described are struck from the body of the strip stock. The three stations disclosed in Figs. 7 and 8 are designated by the letters G, H and J. At station G an initial stamping operation partially severs the tabs. At station H these tabs are bent upwardly, and at station J they are folded over. At a subsequent station, not shown, which would be comparable to stations D and E of Fig. 5, the folded over sections are centralized with respect to the main body of the stock and the locking teeth are formed. The washer produced by the practice of the method illustrated in Figs. 7 and 8 is designated by the numeral 10a in Fig. 9. This washer includes the body portion 12a of double thickness and the locking members 14a.

Particular attention is directed to the cross-sectional disclosure of the folded over body portion as shown in Figs. 2 and 3. There it will be seen that when the inner margin of the body is folded over and the free edge positioned as shown, said edge or free boundary is spaced slightly inwardly from the base or root of an adjacent prong. That is to say, the free boundary or edge of the folded over section is out of vertical alignment with the bases of the locking elements or prongs. Thus, no abrupt body distortion takes place at the roots of the prongs due to the folding over operation, such distortion occurring at a point spaced slightly inwardly from said roots.

From the foregoing it will be apparent that the present invention contemplates a very practical lock washer in which the locking elements cannot be completely flattened and a lock washer which can be produced by simple and economical methods of manufacture. The folded inner margin is not only simple to produce but provides a very positive abutment means between the clamping surface of the screw and the complementary surface of the work. It will be observed that the material which is folded over to produce the double thickness of stock is taken from that portion of the stock which is normally scrapped, to wit, the central portion which is removed to form the aperture for receiving the screw. Hence the invention makes it possible to double the stock thickness along the inner margin of the washer without the necessity of increasing material costs.

Obviously, changes in structural details from those described herein may be made without departing from the spirit and scope of the claims appended hereto.

The invention is hereby claimed as follows:

1. A lock washer formed from spring sheet stock including an annular body portion, and a plurality of yieldable locking elements of normal stock thickness extending from a margin of said body portion providing teeth normally projecting beyond the bounding planes of said body portion and configurated to engage opposite work surfaces when the washer is clampingly engaged therebetween, said body portion comprising a section of stock folded back upon itself so as to present abutment surfaces axially spaced a distance which is greater than the normal thickness of the stock from which the washer is formed, whereby when the abutment surfaces of the washer are clamped between said work surfaces, said teeth will maintain their normal locking engagement with said work surfaces.

2. The method of forming lock washers from spring sheet stock which comprises the steps of forming an aperture in said stock, flexing material in the vicinity of said aperture axially and laterally so as to present a double layer of stock, and then forming locking elements along one margin of said double layer of stock with teeth normally projecting beyond the bounding planes of said double layer of stock.

3. The method of forming lock washers from spring sheet stock which comprises the steps of forming an aperture in said stock, displacing a plurality of annularly disposed sections of the washer stock into overlying relation with respect to the adjacent stock area, and then forming locking elements along one margin of said overlying stock portions with teeth normally projecting beyond the bounding planes of said overlying stock portions.

4. A lock washer formed from spring sheet stock including an annular body portion, and a plurality of yieldable locking elements extending from a margin of said body portion providing teeth normally projecting beyond the bounding planes of said body portion and configurated to engage opposite work surfaces when the washer is clampingly engaged therebetween, said body portion comprising a section of stock folded back upon itself and displaced laterally so as to present abutment surfaces axially spaced a distance which is greater than the normal thickness of the stock from which the washer is formed and positioned at substantially equal axial distances on either side of the section of the body portion formed of a single thickness of stock, whereby when the washer is clamped between said work surfaces said teeth will remain in operative engagement with said work surfaces.

5. The method of forming lock washers from spring sheet stock which comprises the steps of forming an aperture in said stock, flexing material in the vicinity of said aperture axially and laterally so as to present a double layer of stock, the surfaces of which are axially spaced substantially equal distances on opposite sides of the single layer of stock, and then forming locking elements along one margin of said double layer of stock with teeth normally projecting beyond the bounding planes of said double layer of stock.

6. The method of forming lock washers from spring sheet stock, which comprises the steps of forming an aperture in said stock, displacing the material of the stock defining said aperture axially and laterally so as to present an annular fold, displacing said annular fold axially so as to position the outer surfaces substantially equal distances axially on either side of the single layer of stock, then forming locking elements along one margin of said annular fold with teeth normally projecting beyond the bounding planes of said annular folded portion.

7. A lock washer as set forth in claim 1 wherein the abutment surfaces are provided by a continuous annular section of stock of the body portion folded back upon a corresponding annular section.

8. A lock washer as set forth in claim 1 wherein the abutment surfaces are provided by a plurality of annularly disposed sections of stock folded back upon a complementary section.

9. A lock washer as set forth in claim 1 wherein the free edge of the folded over section of the body is spaced radially from the roots of the yieldable locking elements.

10. A lock washer formed from spring sheet stock including an annular body portion, and a plurality of yieldable locking elements extending from a margin of said body portion providing teeth normally projecting beyond the bounding planes of said body portion and configurated to engage opposite work surfaces when the washer is clampingly engaged therebetween, said body portion comprising a section of stock folded back upon itself so as to present abutment surfaces axially spaced a distance which is greater than the normal thickness of the stock from which the washer is formed and positioned on either side of the section of the body portion formed of a single thickness of stock, whereby when the washer is clamped between said work surfaces said teeth will remain in operative engagement with said work surfaces.

OUGLJESA JULES POUPITCH.